July 15, 1947.　　F. J. FURMAN ET AL　　2,424,088
EDUCATIONAL DEVICE FOR AERIAL GUNNERS
Filed Feb. 2, 1945　　6 Sheets-Sheet 1
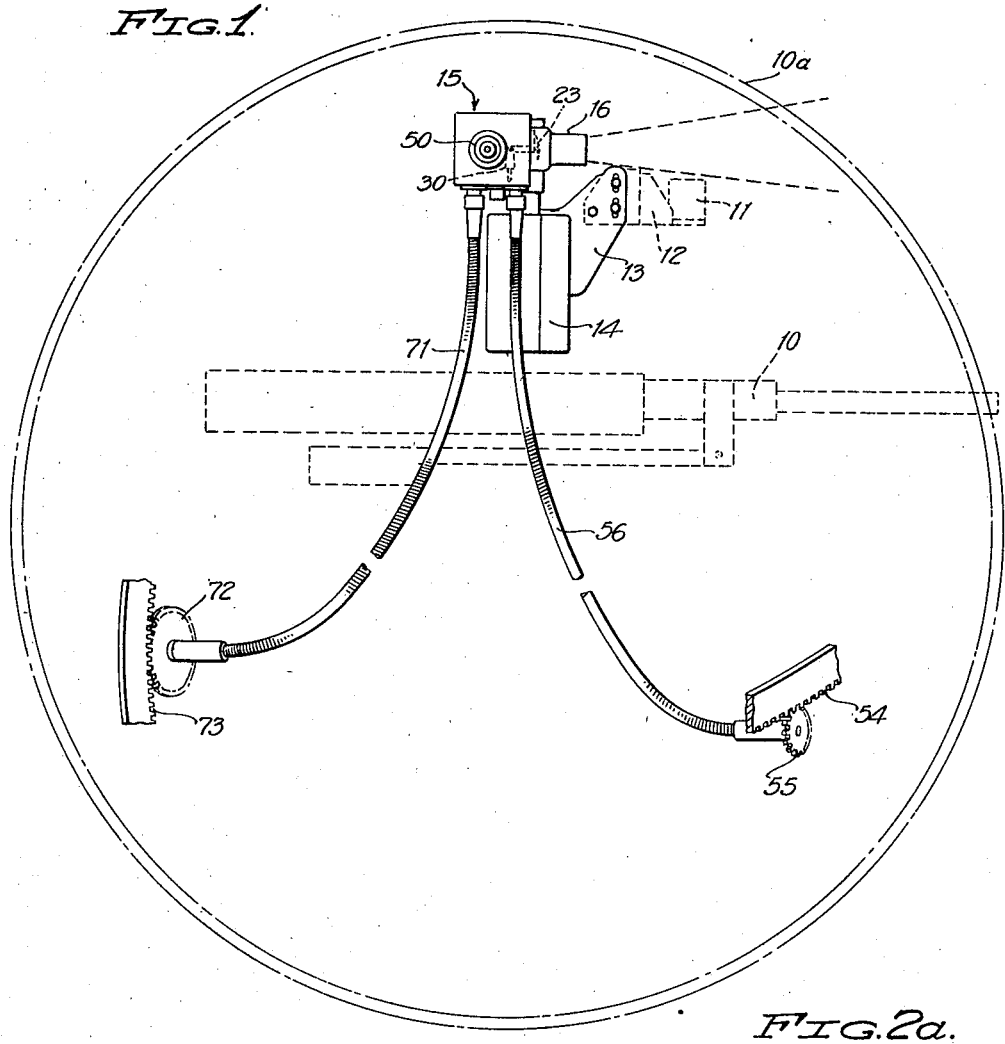
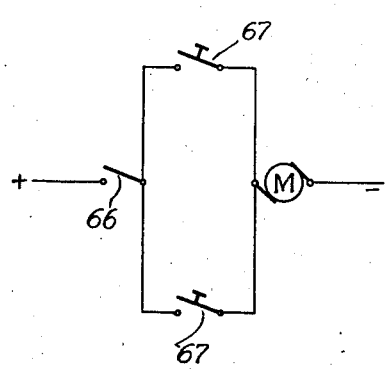
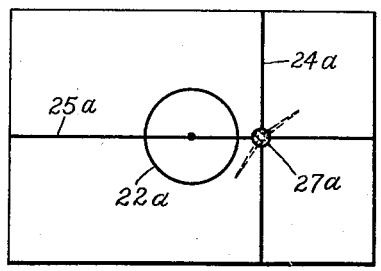
INVENTORS
FRANK J. FURMAN
EUGENE J. LAMB
BY
ATTORNEY July 15, 1947.                F. J. FURMAN ET AL                2,424,088
                    EDUCATIONAL DEVICE FOR AERIAL GUNNERS
                    Filed Feb. 2, 1945              6 Sheets-Sheet 2
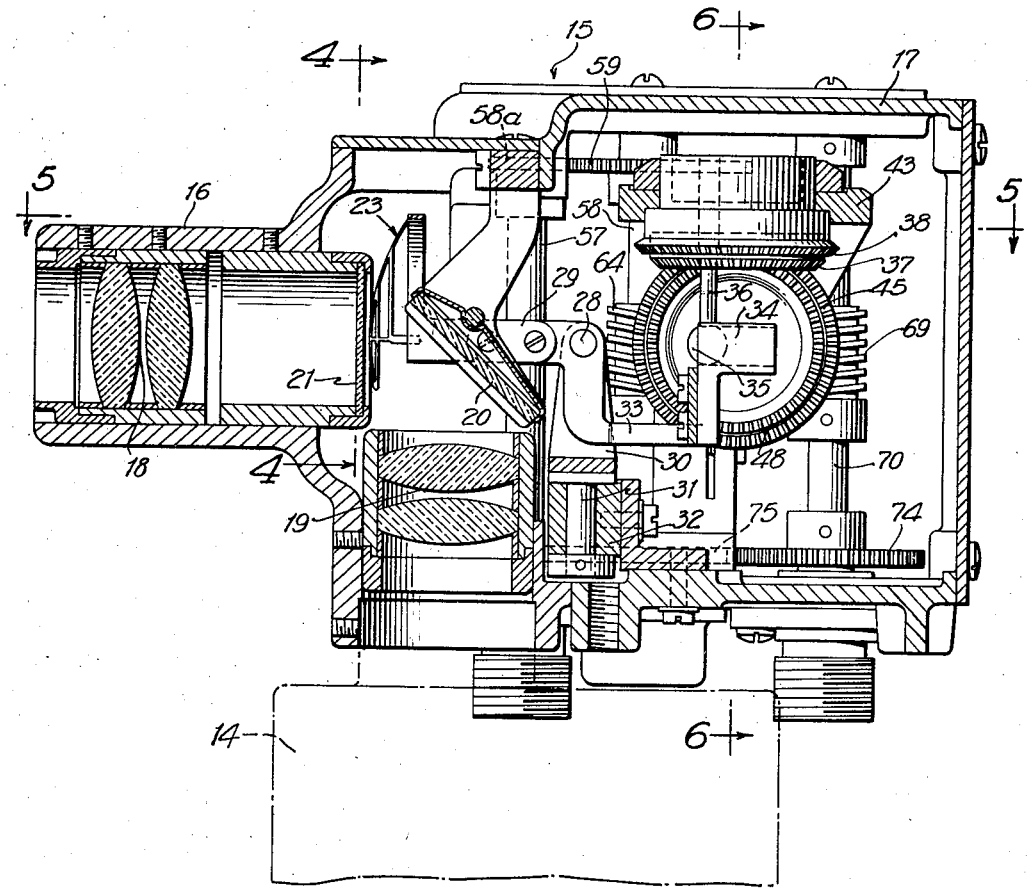
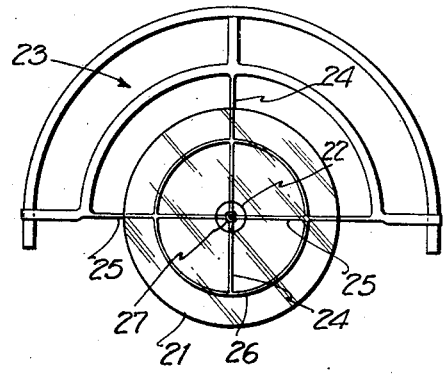
INVENTORS
FRANK J. FURMAN
EUGENE J. LAMB
BY
ATTORNEY July 15, 1947.　　　F. J. FURMAN ET AL　　　2,424,088
EDUCATIONAL DEVICE FOR AERIAL GUNNERS
Filed Feb. 2, 1945　　　6 Sheets-Sheet 3

INVENTORS
FRANK J. FURMAN
EUGENE J. LAMB
BY
ATTORNEY

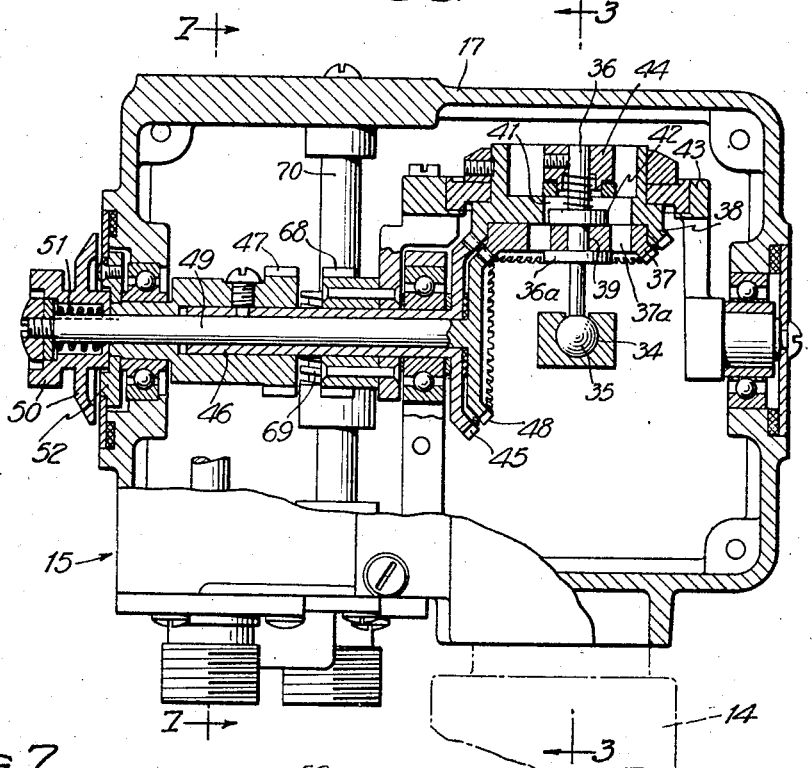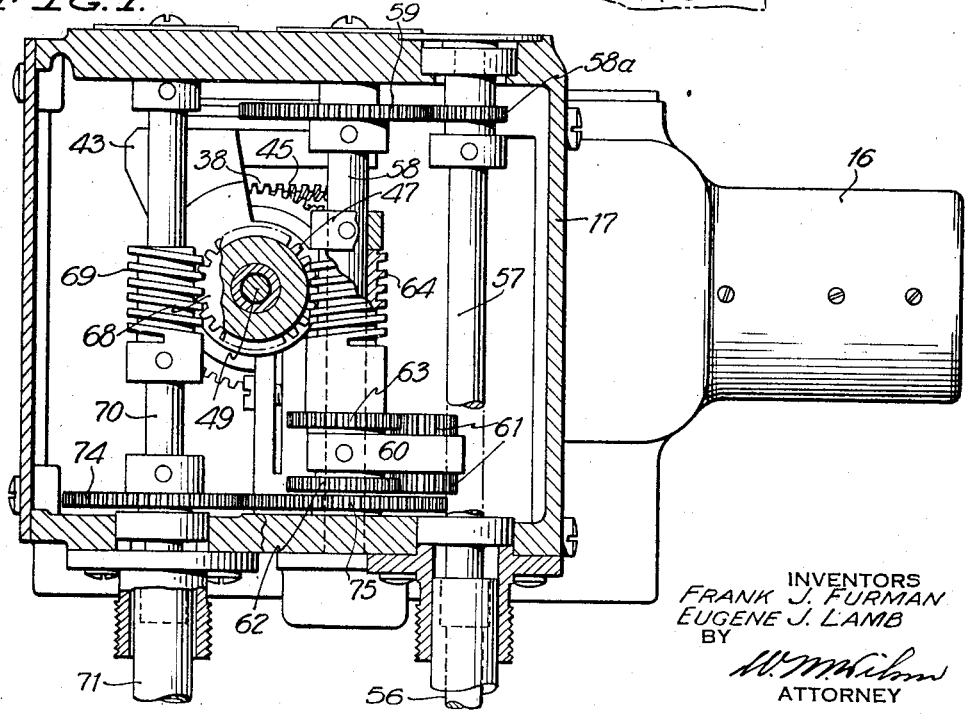

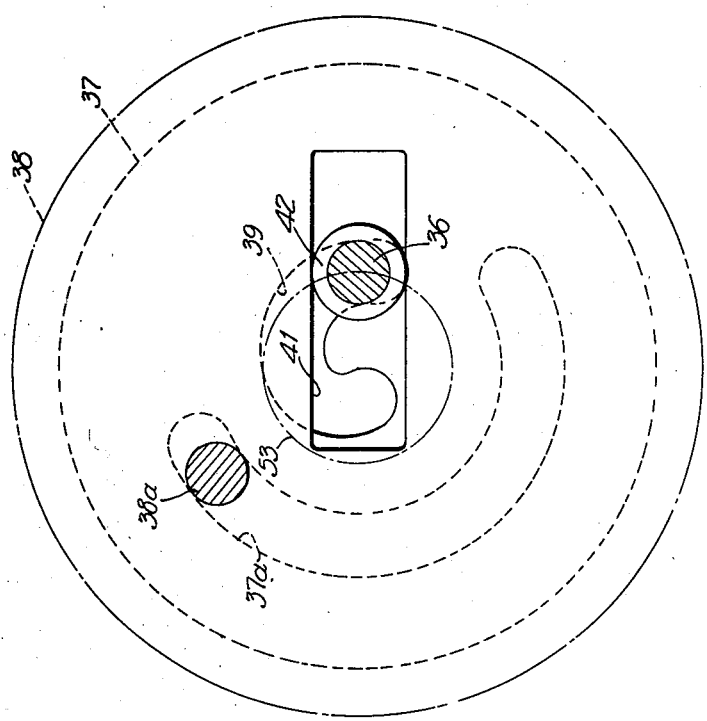
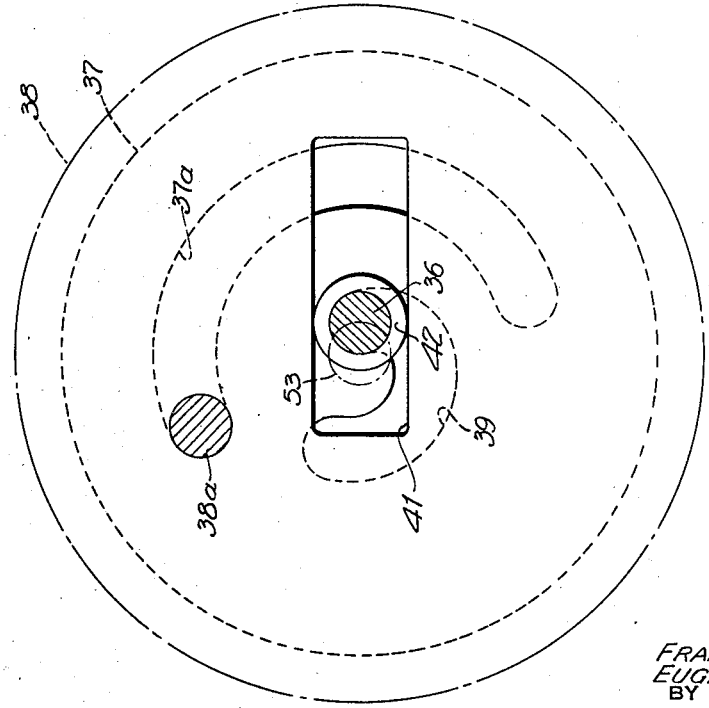

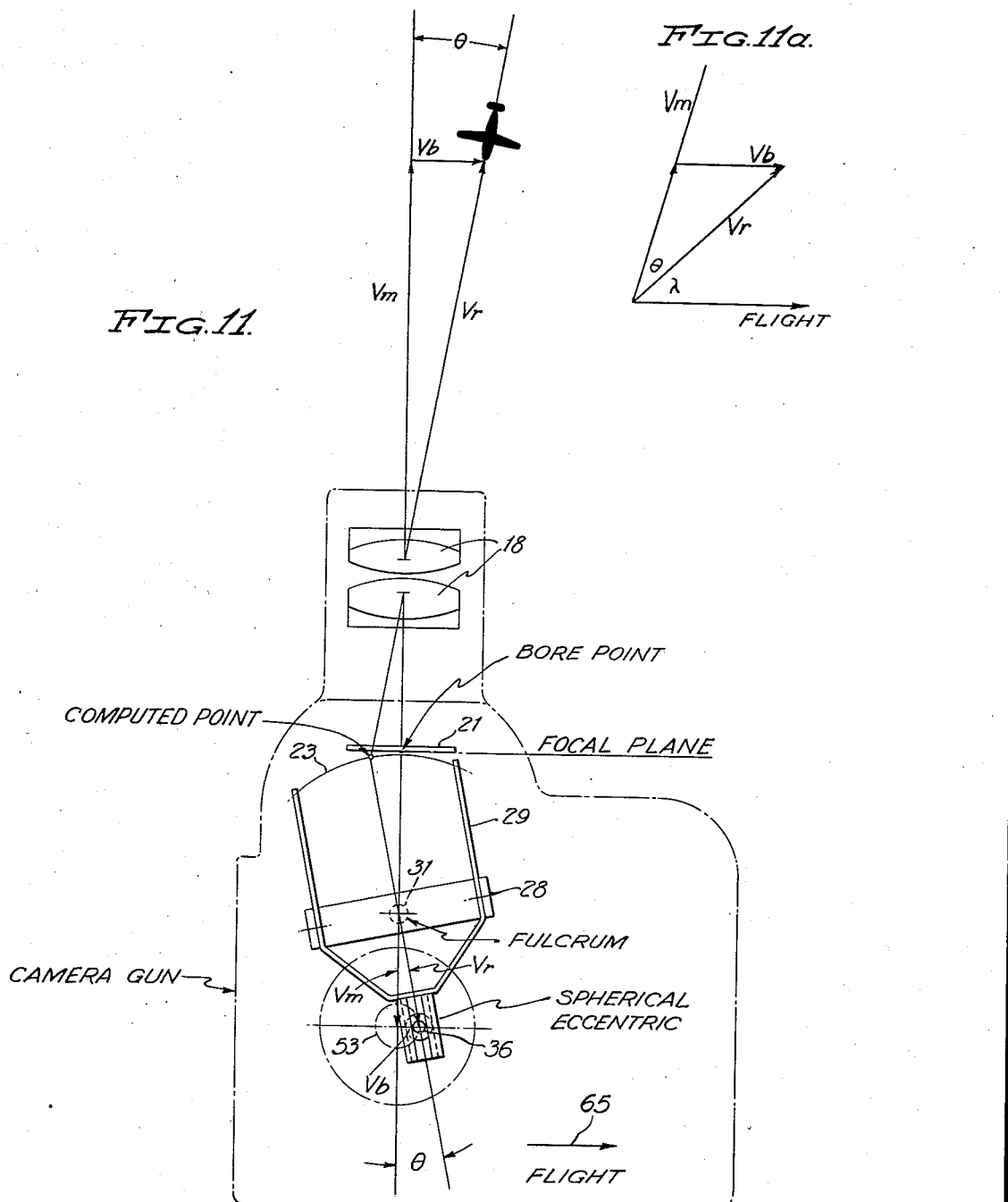

Patented July 15, 1947

2,424,088

UNITED STATES PATENT OFFICE 2,424,088

EDUCATIONAL DEVICE FOR AERIAL GUNNERS

Frank J. Furman, Endicott, and Eugene J. Lamb, Vestal, N. Y., assignors to International Business Machines Corporation, New York, N. Y., a corporation of New York Application February 2, 1945, Serial No. 575,866

4 Claims. (Cl. 35—25)

This invention relates to educational devices and more particularly to devices useful in teaching the art of making war.

The principal object of the invention is to provide a device for the training of an aerial gunner under conditions simulating those of actual combat without the employment of bullets or shells. In carrying out the object of the invention, there is provided a camera fixedly mounted with respect to the gun in the turret of a bomber and aligned so that the center of the field of view of the camera coincides at the chosen range with the borepoint of the gun and the sight.

In the optical system of the camera there is provided a reticle movable in the focal plane of the system and the position of this reticle is controlled by an aligning mechanism which responds to the position of the gun in azimuth and elevation with respect to the longitudinal axis of the plane and also to a manual setting representing the speed of the plane. In the center of the focal plane there is also provided a fixed recticle representing the point of aim of the gun.

When the gun is operated, the camera is also concurrently operated and a picture is taken to record on film the gunner's point of aim, the target, and the direction in which bullets, if fired, would have traveled in still space.

Upon development of the film and observation of the relative positions of the reticles and target, the gunner is enabled to assess his performance.

Since free gun positions of bombers are not offensive weapons but are intended for defense, gunners withhold their fire unless under attack, and it is important that the gunner conserve his ammunition for such event, which is generally indicated by the attacking plane approaching on a collision or a pursuit course with guns bearing. Under these conditions and within the range of the projectile, the target will coincide with the aligned point in the path of the projectile represented by the location of the center of the movable reticle.

A more specific object of the invention is to provide improved mechanism for automatically positioning a movable reticle in a focal plane with respect to a fixed reticle in the same plane to indicate the direction of flight of a bullet with respect to the direction in which the gun is aimed.

Other objects of the invention will be pointed out in the following description and claims and illustrated in the accompanding drawings, which disclose, by way of example, the principle of the invention and the best mode, which has been contemplated, of applying that principle.

In the drawings:

Fig. 1 is a general view showing the apparatus of the invention in its relationship with respect to a turret and gun mounting.

Fig. 2 is a diagram of the camera operating circuit connections.

Fig. 2a is an illustration of the image recorded on a film frame showing the reticles and target.

Fig. 3 is a sectional elevation of the aligning mechanism.

Fig. 4 is a view taken along lines 4—4 of Fig. 3 showing the fixed and movable reticles.

Fig. 6 is a sectional elevation taken on lines 6—6 of Fig. 3 showing the air speed setting devices.

Fig. 7 is a sectional elevation taken on lines 7—7 of Fig. 6.

Figs. 9 and 10 are diagrams showing the interconnecting pin and slot connection between the azimuth gear and air speed settable gear.

Fig. 11 is a schematic diagram showing the vector diagram involved in the solution of the problem.

Fig. 11a is the vector diagram.

Figure 5:
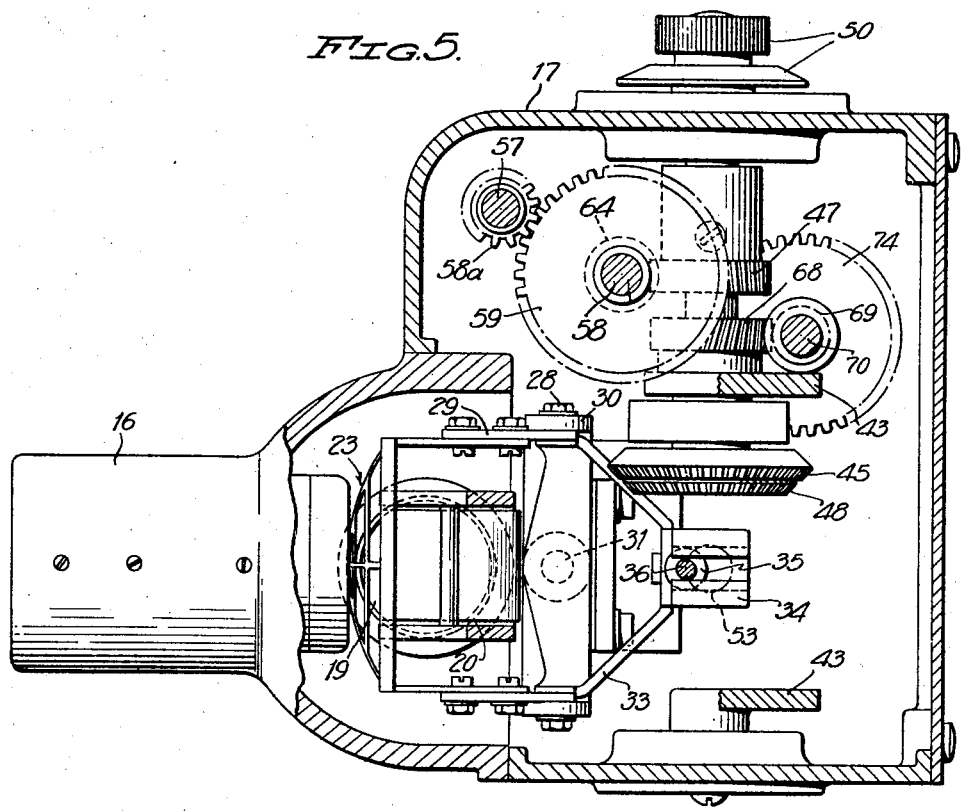
Fig. 5 is a plan section taken along lines 5—5 of Fig. 3.

Referring to the drawings (Fig. 1), 10 represents a machine gun which is mounted in the turret 10a of a bomber in known manner, so that it is integral therewith and moves in azimuth and elevation with the turret as the latter is rotated. 11 represents a part of the framework of the turret, and to this framework there is secured a bracket 12 upon which a camera supporting plate 13 is clamped. Camera 14 is adjustably mounted on plate 13, and it has integral therewith device 15 generally termed the aligner which is provided with a tubular lens holder 16. The camera and aligner are initially adjusted with gun 10, so that the center of the field of view of the camera coincides with the borepoint of the gun and the sight. Thereafter, any movement of the turret will cause like movement of the gun and camera and aligner.

Referring now to Fig. 3, the mechanism of aligner 15 is enclosed in a casing 17 in which an optical system comprising lens 18, 19 and a mirror 20 project an image into camera 14. Intermediate lens 18 and mirror 20 is a reticle comprising a glass disk 21 on whose surface facing mirror 20 is scribed a dot surrounded by a small circle (see Fig. 4) designated 22. This dot and circle are located in the focal plane of the optical system, and in the exact center of the disk, so that the image thereof will be photographed by the camera in the center of the film and indicates the center of the area at which the gun is pointed. In other words, this reticle 22 shows the "point of aim."

Between disk 21 and mirror 20 is a movable reticle 23 formed by cross lines 24, 25, circular line 26 and central aperture 27. This reticle 23 is curved to conform to the surface of a sphere whose radius is equal to the distance from the scribed surface of disk 21 to pivot point 28. Lever 29 which is pivotable in a vertical plane about point 28 supports reticle 23, so that as lever 29 is rocked vertically reticle 23 will move in an arc with the portion thereof passing through the axis of the optical system moving substantially the focal plane of the system, and exposure will show the movable reticle superimposed in various positional relationships with respect to the fixed reticle.

Pivot point 28 comprises bearing studs in a U-shaped bracket 30 which has a pivot stud 31 rotatable in a bearing 32 attached to casing 17. Oscillation of bracket 30 horizontally will carry with it lever 29 and reticle 23 to rock the reticle in an arc in a horizontal direction. There is thus provided an arrangement for rocking the reticle 23 universally about the point of intersection of a line extending through the axis of lens 18 and a line extending axially through the center of pivot stud 31. The vertical axis of stud 31 is located parallel to a line passing (Fig. 1) through the center of rotation of the spherical turret 10a, and vertical to the flight axis and through the mechanism to be described reticle 23 will be rocked through an angle determined by the position of the turret with respect to the plane.

Through mechanism now to be described, lever 29 is rocked through an angle differentially determined by the elevation of the gun with azimuth as a function, and bracket 30 is rocked through an angle determined by the position in azimuth of the gun with respect to the axis of the plane. At dead abeam position, reticle 23 and its supporting arm 29 do not move at all for 360° of elevation movement, whereas at fore and aft it moves its maximum. Referring to Fig. 11a, $$\text{horizontal deflection in mils} = \frac{1000 \sin a}{N + \cos a \cos e}$$

$$\text{vertical deflection in mils} = \frac{1000 \cos a \sin e}{N + \cos a \cos e}$$

where $a$ = azimuth input setting
$e$ = elevation input setting $\frac{1598}{N}$ = air speed setting in knots $N$ = ratio $\frac{Vm}{Vb}$ $\sin \theta = \frac{1}{N} \sin \lambda$ An offset extension 33 of lever 29 has affixed thereto a socket 34 in the form of an open sided cylindrical bore into which there is closely but slidably fitted a ball 35. This ball forms the end of a stem 36 extending through a pair of concentrically mounted gears 37 and 38 (Figs. 3 and 6). Gear 37 has a cam slot 39 (see Figs. 9 and 10) in which stem 36 slides, and gear 38 has a radial slot 41 in which a collar 42 on the stem slides. Gear 38 is suitably journaled on a yoke 43 whereon it is rotatable, and between a collar 44 fastened to the upper end of stem 36 and flange 36a of the stem 36 gear 37 is held against gear 38.

Gears 37 and 38 are relatively rotatable through an arc of about 180° governed by a pin 38a in gear 38, which extends through a concentric slot 37a in gear 37. Figs. 9 and 10 show the two extreme positions of relative rotation between which the stem 36 is settable in accordance with the configuration of cam slot 39. Such relative rotation is manually effected as follows.

Gear 38 meshes with a bevel gear 45 integral with a sleeve 46 to which is fastened a gear 47. Gear 37 meshes with a bevel gear 48 on a rod 49 extending centrally through sleeve 46 and gear 47. To the end of rod 49 is slidably keyed a dial 50 urged by a spring 51 into frictional engagement with a plate 52 integral with gear 47. The dial is calibrated to represent miles or knots per hour, and by drawing the dial slightly away from plate 52 against the pressure of spring 51 the dial and rod 49 may be rotated relatively to shift rod 36 in slot 41. In this manner the air speed of the plane is entered into the aligner with the displacement of rod 35 (Figs. 9 and 10) from the center of gears 37, 38 being proportional to such air speed.

When the turret and gun are now rotated in azimuth, gears 38 and 37 will be rotated together in their displaced relationship, so that the ball 35 on stem 36 will move in a circular path of preset radius designated as 53 in Figs. 5, 9 and 10. Such rotation will cause arm 29 to oscillate bracket 30 on pivot pin 31 and swing the center of reticle 23 horizontally as viewed in Fig. 4. Referring to Fig. 1, 54 represents the azimuth track or rail of the turret and 55 represents a pinion which is suitably supported on the turret so that, as the turret is rotated in azimuth, gear 55 rotates and through a flexible shaft 56 (see also Fig. 7) drives a shaft 57. Gear 58a on this shaft drives a shaft 58 through gear 59. Arm 60 secured to shaft 58 carries differential pinions 61 meshing with gears 62 and 63. With gear 62 stationary, gear 63 and its integral worm 64 free on shaft 58 will be driven and will drive gear 47 to rotate bevel gears 45 and 48 through an angle which will rock the reticle supporting arm 29 through an angle according to the formula given above in connection with Fig. 11a. This angular relationship is shown in Fig. 11 where arrow 65 indicates the direction of flight of the plane to be at right angles to the direction in which the aligner lens and gun are pointed. The line $Vb$ represents the preset plane speed or bomber vector, the line $Vm$ represents the bullet vector or direction in which the gun is pointed, and the line $Vr$ represents the resulting vector of direction of travel of the bullet for the given plane speed and direction.

It will be seen that the angle $\theta$ established by arm 29 displaces the center reticle 23 in the focal plane of the lens system so that, when the camera is operated, the film will record the bore point and the reticle with the aligned displacement or lead required to score a hit on an attacking plane.

Fig. 2 shows the camera circuit simplified to indicate a control switch 66 and switches 67 closed when the gun is operated (or independently closed) to operate the motor M of camera 14 (Fig. 1). Fig. 2a shows the result of the exposure if the gun had been pointed with the proper lead for an attack and indicates that the path of flight of a bullet, if fired, would coincide with the path of the attacking plane. In this figure, the images of the several elements are identified by the same reference characters as the elements themselves, suffixed with the letter $a$. For other relative recording of the attacking plane and reticles, the gunner may later assess his error in aiming.

If the gun were pointed directly fore or aft, the line $Vb$ would coincide with line $Vm$ (Fig. 11) and the two reticles would be concentric to indicate that for an attack along the line of flight no gunner's lead is required. The aligned point (position of reticle 23) appears "on the target" if the target is flying a collision course or pursuit curve. Any other course may be evaluated by the position of the aligned point in advance of the target and along its line of flight.

When the turret is rotated in elevation, the gears 37, 38 and stem 36 (Fig. 3) are rotated in an arc about the center of gears 45, 48. Gear 38 is rotatably supported by frame 43 to which there is secured a gear 68 (Fig. 6) supported for rotation on sleeve 46. Meshing with gear 68 is a worm 69 (Fig. 7) secured to shaft 70 which has flexible drive connection 71 (Fig. 1) with a pinion 72 which is driven from the vertical turret rock 73, so that as the turret is rocked in elevation frame 43 (Fig. 3) is rocked correspondingly.

In Fig. 7 shaft 70 has a gear 74 thereon meshing with a gear 75 integral with gear 62 of the differential, so that rotation of shaft 70 also causes rotation of worm 64 to drive gear 47 and turn gears 45, 48 with frame 43 at the same speed and in the same direction.

Figure 8:
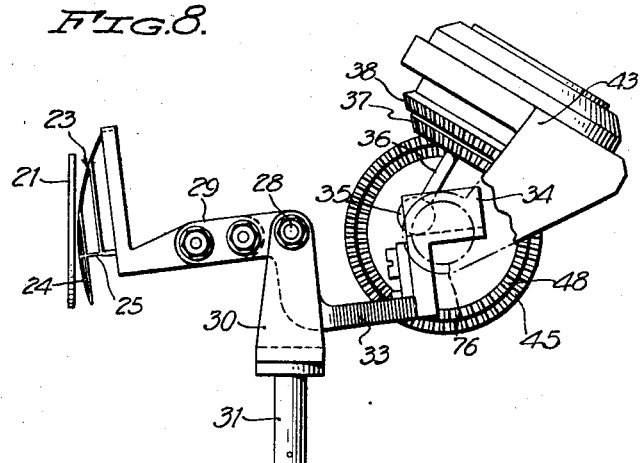
Fig. 8 is a view of parts shown in Fig. 3 with the movable reticle rocked.

Fig. 8 shows the frame 43 rocked in response to an elevational movement of the gun and, as seen, this causes movement of ball 35 in a circular path 76 about the center of gear 48 to rock lever 29 and swing reticle 23 vertically.

The combined movements in azimuth and elevation will thus cause ball 35 to move about on the surface of a segment of a sphere whose radius is determined by the plane's speed, and through arm 29 the center of reticle 23 also moves in the surface of a segment of a sphere whose radius is fixed.

Recapitulating, the apparatus receives three basic input values to determine the deflection or lead required for the bullet to meet the target. These are the plane speed and the azimuth and elevational pointing of the gun. Air resistance and gravity drop are not considered due to their minute value at the ranges dealt with, and the direction a projectile takes will be along the resultant $Vr$ (Fig. 11) of the plane speed $Vb$ and muzzle velocity $Vm$ vectors in the diagram. The length of $Vb$ is variable to accord with changes in speed and the resultant bullet direction $Vr$ is dependent upon the solution of the vector diagram in space and changes with every change of azimuth and elevation of the gun and with every change of speed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In an apparatus of the class described having a gun mounted for movement in azimuth and elevation and an optical system aligned with the gun, the combination of a reticle configured to conform to the surface of the segment of a sphere coaxial with the objective lens of the optical system, the surface of said segment being tangential to the focal plane of the optical system, and means responsive to azimuth and elevational movement of the gun for moving said reticle universally about the spherical axis.

2. The invention set forth in claim 1, in which the means responsive to movement of the gun comprises a lever mounted intermediate its extremities for universal movement about the axis of said spherical segment, said reticle being attached to one extremity and a cylindrical socket at the opposite end, a ball slidable in said socket, the movement of the gun in azimuth and elevation causing said ball to move in a path described by the surface of a sphere whereby the angular position of the ball about the axis of its sphere will cause a corresponding axial displacement of the reticle in the surface of its sphere.

3. In a device of the class described, a reticle mounted for movement in the surface of a spherical segment tangential to the focal plane of an optical system, said mounting comprising a lever pivoted for universal movement, a socket on said lever and a ball in said socket, a gear supporting said ball and rotatable to rock the ball in a circle parallel to the plane of the gear, and means for varying the plane of rotation of said gear to cause the ball to move in the surface of a sphere and through said lever move the reticle in the same manner.

4. In a device of the class described, an element mounted for rotation about its axis in response to a directional movement in azimuth and mounted for movement about an axis normal to its rotational axis in response to a directional movement in elevation, a pivot rod mounted in said element eccentric to and parallel to the axis of rotation of the element, whereby the end of said rod will move in a path described by the surface of a sphere upon said directional movements of the element, a reticle and a lever connection between said reticle and the end of said rod to cause the reticle to move in a corresponding path.

FRANK J. FURMAN.
EUGENE J. LAMB.

REFERENCES CITED

The following references are of record in the file of this patent:

UNITED STATES PATENTS

| Number | Name | Date |
|---|---|---|
| 2,194,141 | Estoppey | Mar. 19, 1940 |
| 2,210,090 | Lutz | Aug. 6, 1940 |
| 2,047,070 | Horner | July 7, 1936 |
| 1,724,092 | Kauch | Aug. 13, 1929 |
| 1,724,093 | Kauch | Aug. 13, 1929 |
| 2,089,901 | Kollmayer | Aug. 10, 1937 |
| 2,230,149 | Weddington | Jan. 28, 1941 |
| 2,186,545 | Kuppenbender | Jan. 9, 1940 |
| 906,924 | Pogolski | Dec. 15, 1908 |